(12) United States Patent
Lee et al.

(10) Patent No.: US 12,540,679 B2
(45) Date of Patent: Feb. 3, 2026

(54) MULTI-MODE CONTROL MODULE

(71) Applicant: Hanon Systems, Daejeon (KR)

(72) Inventors: JiChul Lee, Sterling Heights, MI (US); Emma Michelle Grissom, Howell, MI (US); Evan Wang Delosh, Ann Arbor, MI (US); Edward William Sanders, III, Monroe, MI (US)

(73) Assignee: HANON SYSTEMS, Daejeon (KR)

( * ) Notice: Subject to any disclaimer, the term of this patent is extended or adjusted under 35 U.S.C. 154(b) by 7 days.

(21) Appl. No.: 18/486,550

(22) Filed: Oct. 13, 2023

(65) Prior Publication Data

US 2024/0360910 A1 Oct. 31, 2024

Related U.S. Application Data

(60) Provisional application No. 63/498,742, filed on Apr. 27, 2023.

(51) Int. Cl.
*F16K 11/22* (2006.01)
*F16K 11/24* (2006.01)

(52) U.S. Cl.
CPC .............. *F16K 11/22* (2013.01); *F16K 11/24* (2013.01)

(58) Field of Classification Search
CPC ...... F16K 11/0856; F16K 11/12; F16K 11/14; F16K 11/18; F16K 11/165; F16K 11/22
See application file for complete search history.

(56) References Cited

U.S. PATENT DOCUMENTS

| | | | |
|---|---|---|---|
| 9,404,594 B2 * | 8/2016 | Morein | F16K 11/0856 |
| 9,903,257 B2 * | 2/2018 | Heldberg | F01P 7/14 |
| 10,808,863 B2 * | 10/2020 | Bugeja | F16K 11/165 |
| 12,110,973 B2 * | 10/2024 | Tiemeyer | F01P 7/165 |
| 2015/0027572 A1 * | 1/2015 | Morein | F16K 41/026 |
| | | | 137/594 |
| 2015/0286224 A1 * | 10/2015 | Bartonek | F16K 11/166 |
| | | | 236/101 R |
| 2022/0316609 A1 * | 10/2022 | Tiemeyer | F16K 11/0853 |

FOREIGN PATENT DOCUMENTS

| | | |
|---|---|---|
| CN | 217463322 U | 9/2022 |
| CN | 218267368 U | 1/2023 |
| KR | 10-2019-0116911 A | 10/2019 |
| KR | 10-2022-0071316 A | 5/2022 |
| WO | 2022-260006 A1 | 12/2022 |

* cited by examiner

*Primary Examiner* — Reinaldo Sanchez-Medina
(74) *Attorney, Agent, or Firm* — Shumaker, Loop & Kendrick, LLP; James D. Miller

(57) ABSTRACT

A multi-mode control module for selectively controlling a flow of one or more fluids through a thermal management system is disclosed. The control module includes a fluid valve system in fluid communication with one or more fluid manifolds. The fluid valve system includes at least one fluid valve assembly disposed in a housing defining a plurality of flow paths. Each fluid valve assembly includes a plurality of flow control members in stacked relationship moveably disposed and selectively positionable within the housing to achieve various operating modes of the control module, and thereby, the thermal management system.

11 Claims, 15 Drawing Sheets

VALVE POSITIONS

| VALVE | 1st | 2nd | 3rd |
|---|---|---|---|
| 1st MEMBER ANGLE [°] | 0 | 0 | 135 |
| 2nd MEMBER ANGLE [°] | 0 | PROPORTIONAL VALVE_1 | PROPORTIONAL VALVE_2 |

FIG. 6

VALVE POSITIONS

| VALVE | 1st | 2nd | 3rd |
|---|---|---|---|
| 1st MEMBER ANGLE [°] | 45 | 45 | 135 |
| 2nd MEMBER ANGLE [°] | 0 | PROPORTIONAL VALVE_1 | PROPORTIONAL VALVE_2 |

FIG. 7

VALVE POSITIONS

| VALVE | 1st | 2nd | 3rd |
|---|---|---|---|
| 1st STORY ANGLE [°] | 135 | 45 | 90 |
| 2nd STORY ANGLE [°] | 45 | PROPORTIONAL VALVE_1 | PROPORTIONAL VALVE_2 |

FIG. 8

VALVE POSITIONS

| VALVE | 1st | 2nd | 3rd |
|---|---|---|---|
| 1st MEMBER ANGLE [°] | 90 | 135 | 135 |
| 2nd MEMBER ANGLE [°] | 0 | PROPORTIONAL VALVE_1 | PROPORTIONAL VALVE_2 |

FIG. 9

VALVE POSITIONS

| VALVE | 1st | 2nd | 3rd |
|---|---|---|---|
| 1st MEMBER ANGLE [°] | 135 | 90 | 45 |
| 2nd MEMBER ANGLE [°] | 90 | PROPORTIONAL VALVE_1 | PROPORTIONAL VALVE_2 |

FIG. 10

VALVE POSITIONS

| VALVE | 1st | 2nd | 3rd |
|---|---|---|---|
| 1st MEMBER ANGLE [°] | 135 | 0 | 0 |
| 2nd MEMBER ANGLE [°] | 135 | PROPORTIONAL VALVE_1 | PROPORTIONAL VALVE_2 |

FIG. 11

| MODE | 1ST VALVE | 2ND VALVE | 3RD VALVE | PROPORTIONAL VALVE_1 | | | PROPORTIONAL VALVE_2 | |
|---|---|---|---|---|---|---|---|---|
| | | | | WC2-HCl | WC2-BOTH | WC2-LTR | BYPASS | NON-BYPASS |
| IDLE | 0 | 0 | 0 | 0 | 0 | 0 | 0 | 0 |
| B | 5 | 285 | 285 | 100 | 145 | 190 | 145 | 100 |
| C | 5 | 195 | 285 | 100 | 145 | 190 | 235 | 190 |
| D | 5 | 195 | 195 | 100 | 145 | 190 | 145 | 100 |
| BH | 50 | 240 | 285 | 100 | 145 | 190 | 145 | 100 |
| H | 95 | 240 | 285 | 100 | N/A | N/A | 145 | 100 |
| P | 140 | 240 | 240 | 100 | N/A | N/A | 145 | 100 |
| UNRE | 145 | 290 | 290 | 290 | 290 | 290 | 290 | 290 |

FIG. 16

VALVE POSITIONS

| VALVE | 1st | 2nd | 3rd |
|---|---|---|---|
| 1st MEMBER ANGLE [°] | 5 | 285 | 285 |
| 2nd MEMBER ANGLE [°] | N/A | PROPORTIONAL VALVE_1 | PROPORTIONAL VALVE_2 |

FIG. 17

VALVE POSITIONS

| VALVE | 1st | 2nd | 3rd |
|---|---|---|---|
| 1st MEMBER ANGLE [°] | 5 | 195 | 285 |
| 2nd MEMBER ANGLE [°] | N/A | PROPORTIONAL VALVE_1 | PROPORTIONAL VALVE_2 |

FIG. 18

VALVE POSITIONS

| VALVE | 1st | 2nd | 3rd |
|---|---|---|---|
| 1st MEMBER ANGLE [°] | 5 | 195 | 195 |
| 2nd MEMBER ANGLE [°] | N/A | PROPORTIONAL VALVE_1 | PROPORTIONAL VALVE_2 |

FIG. 19

VALVE POSITIONS

| VALVE | 1st | 2nd | 3rd |
|---|---|---|---|
| 1st MEMBER ANGLE [°] | 50 | 240 | 285 |
| 2nd MEMBER ANGLE [°] | N/A | PROPORTIONAL VALVE_1 | PROPORTIONAL VALVE_2 |

FIG. 20

VALVE POSITIONS

| VALVE | 1st | 2nd | 3rd |
|---|---|---|---|
| 1st MEMBER ANGLE [°] | 95 | 240 | 285 |
| 2nd MEMBER ANGLE [°] | N/A | PROPORTIONAL VALVE_1 | PROPORTIONAL VALVE_2 |

FIG. 21

VALVE POSITIONS

| VALVE | 1st | 2nd | 3rd |
|---|---|---|---|
| 1st MEMBER ANGLE [°] | 140 | 240 | 240 |
| 2nd MEMBER ANGLE [°] | N/A | PROPORTIONAL VALVE_1 | PROPORTIONAL VALVE_2 |

FIG. 22

MULTI-MODE CONTROL MODULE

CROSS-REFERENCE TO RELATED APPLICATION

This application claims the benefit of U.S. Provisional Patent Application Ser. No. 63/498,742, filed Apr. 27, 2023, the entirety of which is herein incorporated by reference.

FIELD

The disclosure relates to a thermal management system, and more particularly to a multi-mode control module for a thermal management system.

BACKGROUND

Vehicle heat exchangers, such as radiators, have valves that are used to control the rate that a fluid such as coolant, for example, is allowed to flow through the system. With the increase in government mandated fuel economy regulations, companies are increasingly looking for new technology that will reduce the parasitic losses and improve efficiency of internal combustion engines. Furthermore, the introduction of hybrid and fully electric vehicle powertrains has introduced powertrain and thermal management complexities due to the need to control the temperature of batteries, inverter electronics, electric motors, etc. These trends lead to the need for more intelligently controlled fluid valve systems.

Conventional valve systems include diverter balls, cylinders, and the like to enable the heat exchangers to receive various intake and exhaust flows. As such, a single heat exchanger may function as a charge air cooler (CAC), exhaust gas recirculation (EGR) cooler, and heat recovery device. While these designs may provide adequate performance for proportional flow applications, they do have some drawbacks. For example, some conventional valve systems have a vertical inlet at a base of a diverter valve. This allows a wider outlet to provide smooth blending of flow between two horizontal outlets positioned 90 degrees radially apart. With the vertical inlet, the inlet will not take up space on an outer diameter on a cylinder needed for the wider outlet and the inlet can remain in a stable position since it is located on a rotational axis of the cylinder. However, the vertical inlet on the cylinder typically requires a vertical inlet on a port housing of the valve system. The vertical inlet on the port housing, and fluid connections to that vertical inlet, consume valuable packaging space in a vehicle in relation to all of the other vehicle components mounted around the valve system.

Accordingly, it would be desirable to produce a multi-mode control module for a thermal management system wherein a size, weight, and cost thereof are minimized, while optimizing a performance and function of the thermal management system.

SUMMARY

In concordance and agreement with the presently described subject matter, a multi-mode control module for a thermal management system, which minimizes a size, weight, and cost thereof, while optimizing a performance and function thereof, has been newly designed.

In one embodiment, a fluid valve assembly, comprises: a first flow control member; and a second flow control member in stacked relationship with the first flow control member, wherein the first flow control member is configured to rotate substantially simultaneously and independently from the second control member.

In another embodiment, a control module, comprises: at least one fluid manifold; and a fluid valve system in fluid communication with the at least one fluid manifold, wherein the control module is configured to selectively control a flow of one or more fluids through a thermal management system, wherein the fluid valve system includes a plurality of fluid valve assemblies, wherein at least one of the fluid valve assemblies comprises: a first flow control member; and a second flow control member in stacked relationship with the first flow control member, wherein the first flow control member is configured to rotate substantially simultaneously and independently from the second control member.

In yet another embodiment, a method of operation of a fluid valve assembly, comprises: providing a first flow control member; providing a second flow control member in stacked relationship with the first flow control member, wherein the first flow control member is configured to rotate substantially simultaneously and independently from the second control member; causing a rotational movement of the first flow control member in a first direction to selectively position the second flow control member in a desired position; and causing a rotational movement of the first flow control member in an opposite second direction to selectively position the first control member in a desired position.

As aspects of some embodiments, each of the fluid valve assemblies is configured to be independently operated from the other fluid valve assemblies of the fluid valve system.

As aspects of some embodiments, a position of at least one of the first flow control member and the second flow control member depends on an operating mode of the thermal management system.

As aspects of some embodiments, one of the fluids is a refrigerant and another one of the fluids is a coolant.

As aspects of some embodiments, the first flow control member is configured to be driven by at least one of a driving element and an actuator.

As aspects of some embodiments, the second flow control member is configured to be driven by the first flow control member.

As aspects of some embodiments, at least one of the first flow control member and the second flow control member includes a main body having at least fluid passageway formed therein.

As aspects of some embodiments, the main body of the first flow control member includes at least one driven element provided thereon.

As aspects of some embodiments, the main body of the first flow control member includes at least one positioning element extending axially outwardly from a surface thereof.

As aspects of some embodiments, the main body of the second flow control member includes at least one positioning element extending axially outwardly from a surface thereof.

As aspects of some embodiments, the at least one positioning element of the first flow control member is configured to selectively engage the at least one positioning element of the second flow control member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a table indicating valve positions of the fluid valve assemblies of the control module of FIG. 1 when the control module is operating in a battery cooling mode (Mode B);

FIG. 7 is a table indicating valve positions of the fluid valve assemblies of the control module of FIG. 1 when the control module is operating in a cabin and battery active cooling mode (Mode C);

FIG. 8 is a table indicating valve positions of the fluid valve assemblies of the control module of FIG. 1 when the control module is operating in a cabin cooling/dehumidify/re-heat with passive battery cooling mode (Mode D);

FIG. 9 is a table indicating valve positions of the fluid valve assemblies of the control module of FIG. 1 when the control module is operating in a cabin cooling with battery circulate mode (Mode N);

FIG. 10 is a table indicating valve positions of the fluid valve assemblies of the control module of FIG. 1 when the control module is operating in a cabin and battery heating or stationary battery only heating mode (Mode H);

FIG. 11 is a table indicating valve positions of the fluid valve assemblies of the control module of FIG. 1 when the control module is operating in a cabin heating with passive battery heating and cooling mode (Mode P);

Figure 12:
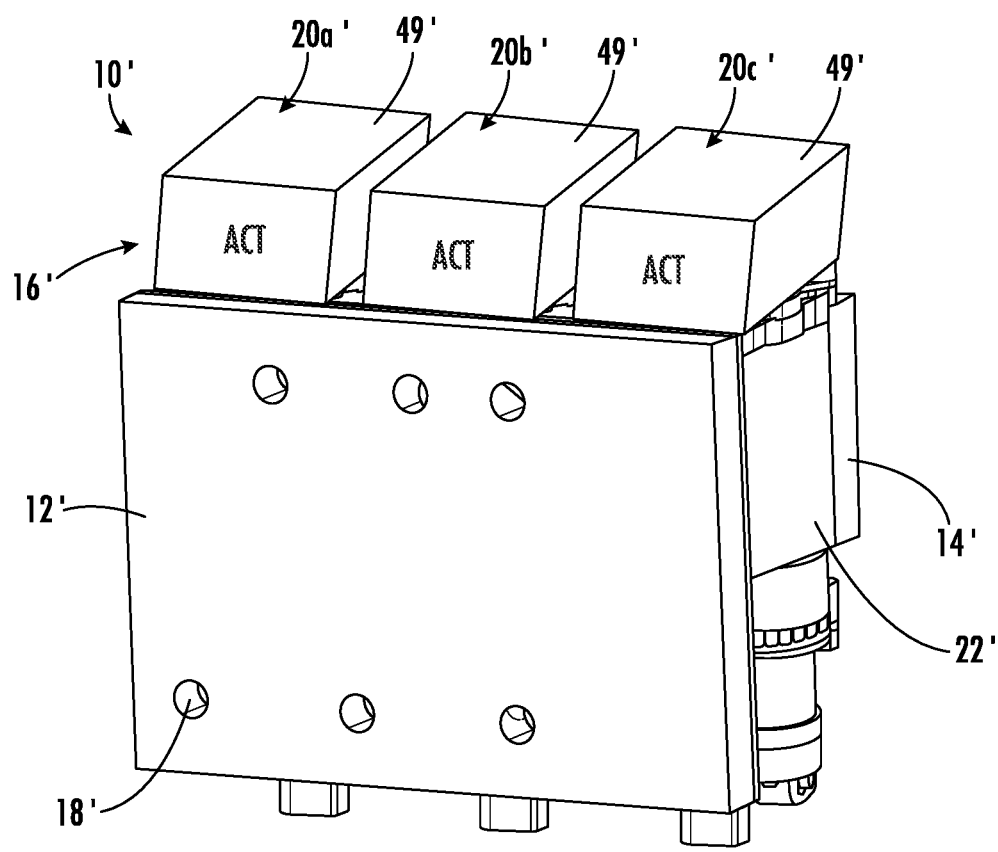
FIG. 12 is a thermal management system interface side perspective view of a multi-mode control module according to another embodiment of the present disclosure, wherein the control module includes a fluid valve system in fluid communication with a pair of fluid manifolds to selectively control a flow of one or more fluids through the thermal management system.
Figure 13:
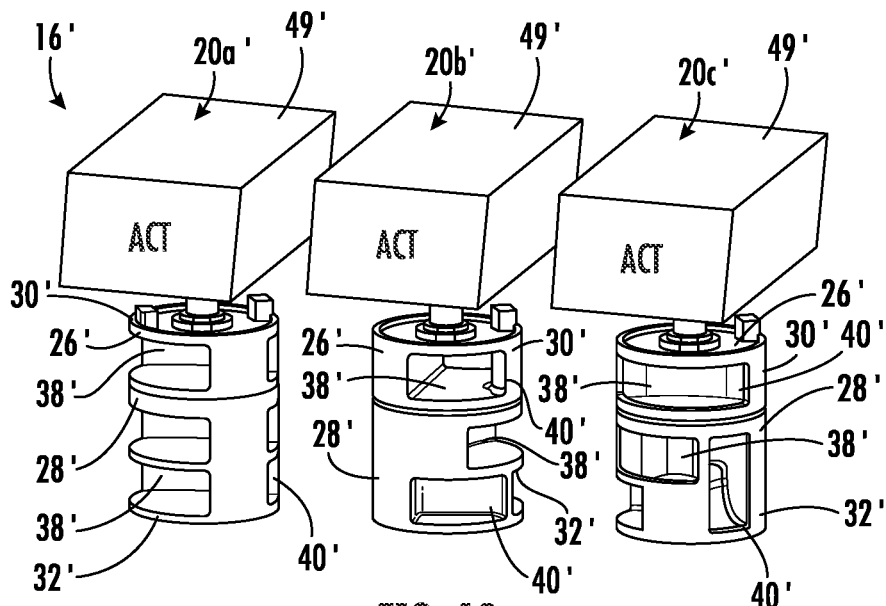
FIG. 13 is a perspective view of a plurality of fluid valve assemblies of the fluid valve system of the control module of FIG. 12.
Figure 14:
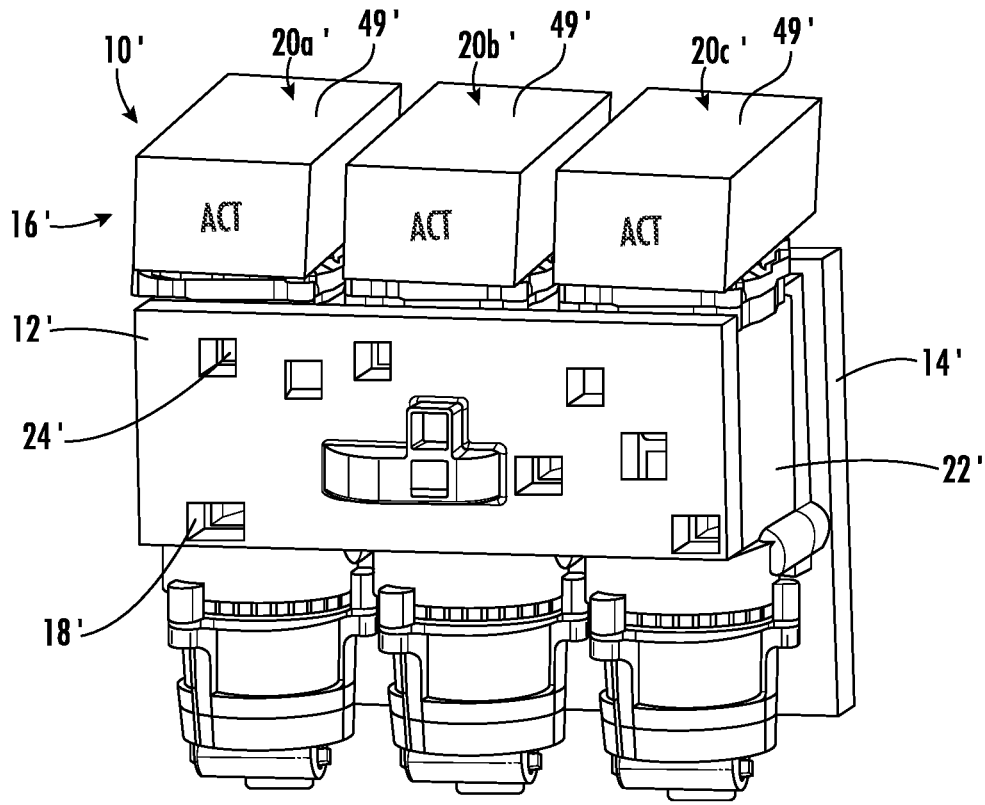
FIG. 14 is a vehicle interface side perspective view of the control module of FIG. 12.
Figure 15:
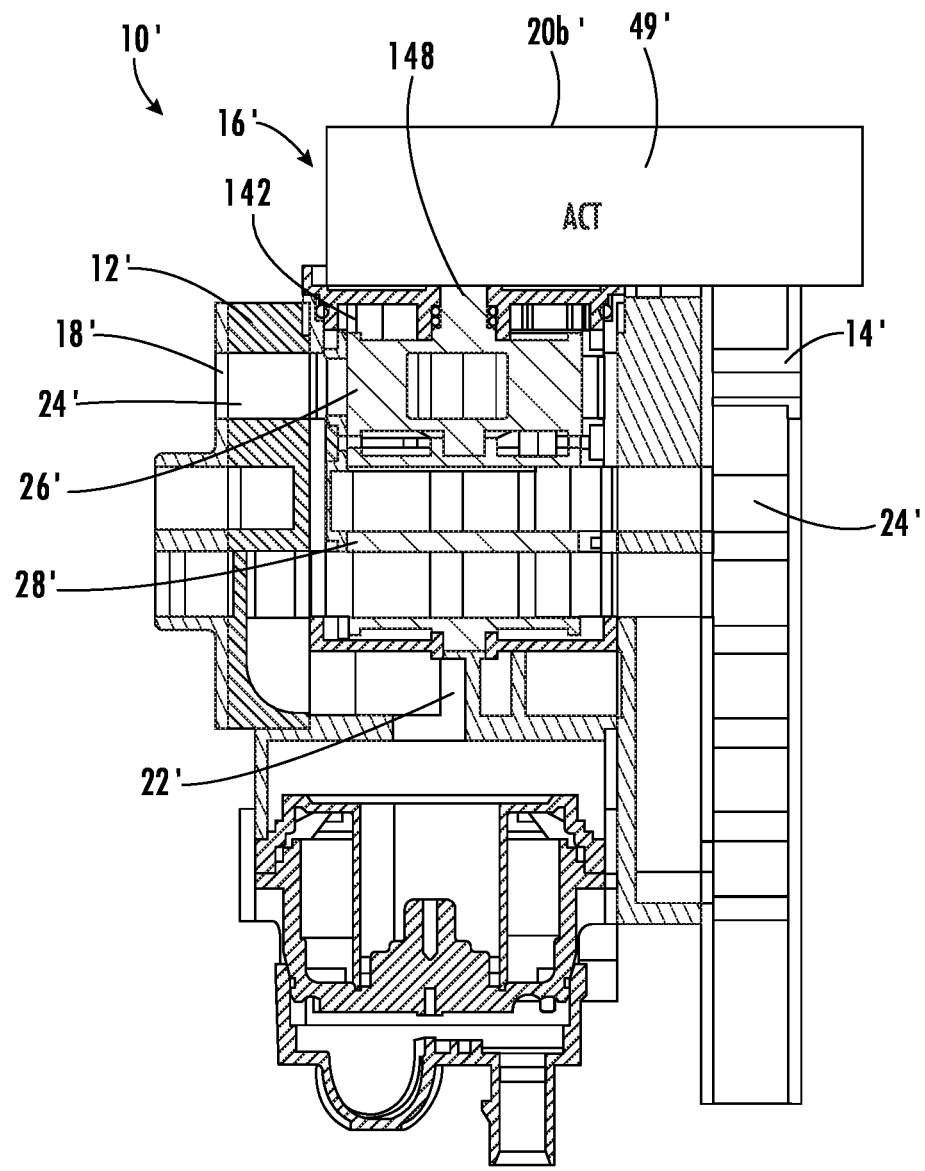

FIG. 15 an enlarged cross-sectional view of the control module of FIG. 12;

FIG. 16 is a table indicating valve positions of the fluid valve assemblies of the control module of FIG. 12, a heater core valve, and a low-temperature radiator bypass valve across various modes of the thermal management system;

FIG. 17 is a table indicating valve positions of the fluid valve assemblies of the control module of FIG. 12 when the control module is operating in the battery cooling mode (Mode B);

FIG. 18 is a table indicating valve positions of the fluid valve assemblies of the control module of FIG. 12 when the control module is operating in the cabin and battery active cooling mode (Mode C);

FIG. 19 is a table indicating valve positions of the fluid valve assemblies of the control module of FIG. 12 when the control module is operating in the cabin cooling/dehumidify/re-heat with passive battery cooling mode (Mode D);

FIG. 20 is a table indicating valve positions of the fluid valve assemblies of the control module of FIG. 12 when the control module is operating in the cabin cooling with battery circulate mode (Mode N);

FIG. 21 is a table indicating valve positions of the fluid valve assemblies of the control module of FIG. 12 when the control module is operating in a cabin and battery heating or stationary battery only heating mode (Mode H);

FIG. 22 is a table indicating valve positions of the fluid valve assemblies of the control module of FIG. 12 when the control module is operating in the cabin heating with passive battery heating and cooling mode (Mode P).

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
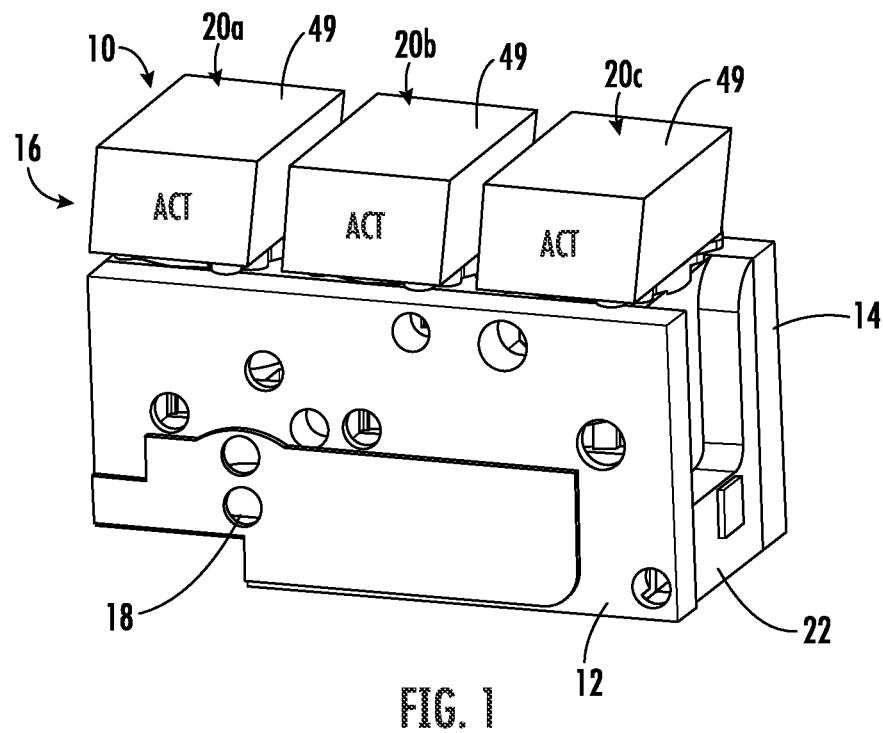
FIG. 1 is a vehicle interface side perspective view of a multi-mode control module according to an embodiment of the present disclosure, wherein the control module includes a fluid valve system in fluid communication with a pair of fluid manifolds to selectively control a flow of one or more fluids through a thermal management system.
Figure 4:
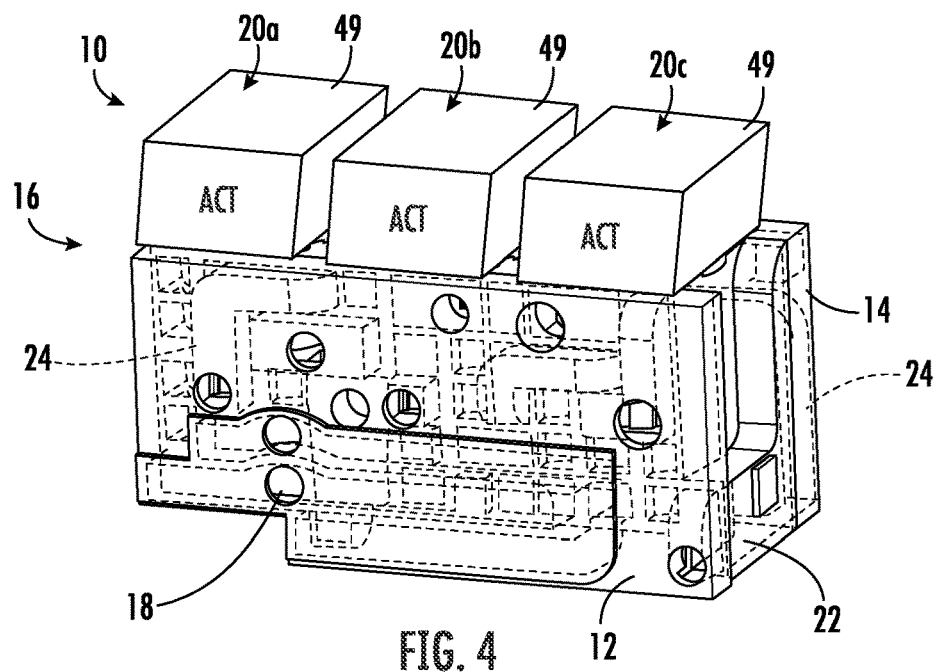
FIG. 4 is a vehicle interface side perspective view of the control module of FIG. 1, wherein various fluid flow paths are shown in dashed lines.
Figure 5:
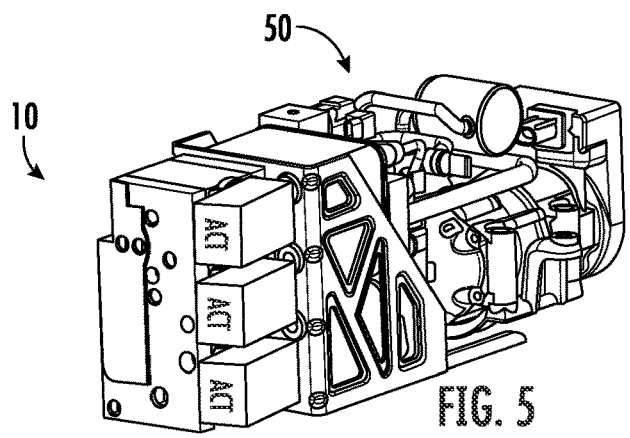
FIG. 5 is a perspective view of the control module of FIG. 1 coupled to a thermal management subsystem.

FIGS. 1 and 4 illustrate a multi-mode control module 10 according to an embodiment of the present disclosure. Preferably, the control module 10, as shown in FIG. 5, may be configured for a thermal management system 50 of an electric or hybrid vehicle. It is understood that the control module 10 may be coupled to any component and/or subsystem of the thermal management system 50 by any method and means as desired. The control module 10 may be configured to selectively control a flow of one or more fluids (e.g., coolant, refrigerant) through the thermal management system 50, as shown schematically in FIGS. 7, 9, 11, 13, 15, and 17. It should be appreciated, however, that the control module 10 may be employed in other fluid-flow control applications as desired.

The control module 10 may include a pair of fluid manifolds 12, 14 disposed on opposing sides of a fluid valve system 16. Each of the fluid manifolds 12, 14 may include one or more openings 18 formed therein. In some embodiments, the openings 18 may perform as ports to provide fluid communication between the control module 10 and various components of the thermal management system 50. It is understood that the openings 18 may be formed at other locations in the fluid manifolds 12, 14 than shown. It is also understood that each of the fluid manifolds 12, 14 may have any size, shape, and configuration as desired to optimize a performance and function of the control module 10, and thereby the thermal management system 50.

Figure 2:
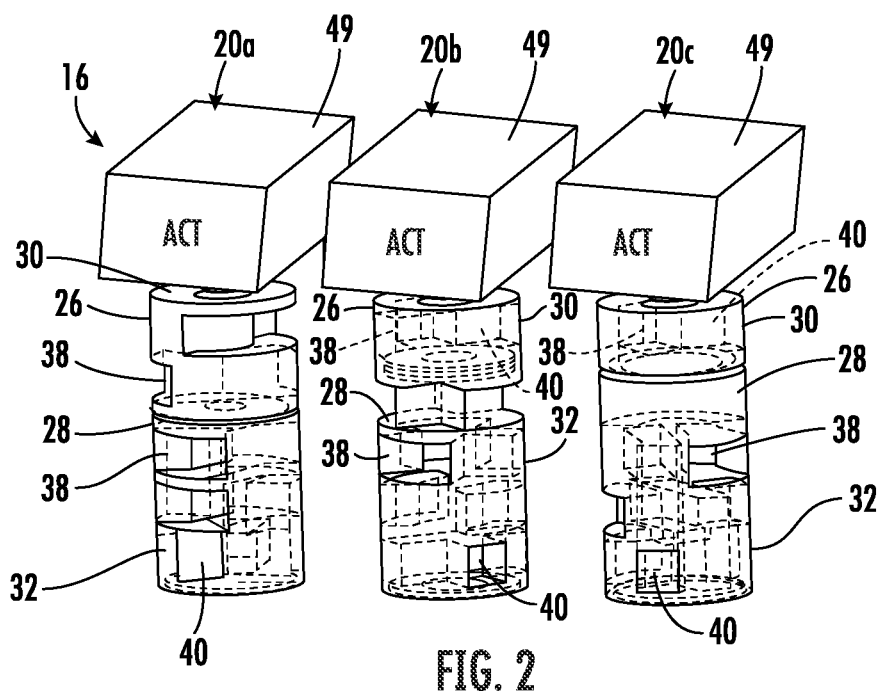
FIG. 2 is a perspective view of a plurality of fluid valve assemblies of the fluid valve system of the control module of FIG. 1.

In some embodiments, the fluid valve system 16 comprises at least one fluid valve assembly 20 disposed in a housing 22 defining a plurality of fluid flow paths 24 (depicted by dashed lines in FIG. 4). Each of the fluid flow paths 24 may be in fluid communication with one or more of the openings 18 formed at least one of the fluid manifolds 12, 14 of the control module 10. In one particular embodiment, the fluid valve system 16 includes a first fluid valve assembly 20a, a second fluid valve assembly 20b, and a third fluid valve assembly 20c. More or less fluid valve assemblies 20 may be employed in the control module 10 if desired. As best shown in FIG. 2, each of the fluid valve assemblies 20a, 20b, 20c may include a first flow control member 26 and a second flow control members 28 moveably disposed and selectively positionable within the housing 22 to achieve various operating modes of the control module 10, and thereby, optimize performance and function of the thermal management system 50.

In certain embodiments, the flow control members 26, 28 each may comprise a main body 30, 32, respectively. Both the main body 30 of the first flow control members 26 and the main body 32 of the second flow control members 28 may have a generally cylindrical shape. However, it is understood that each of the main bodies 30, 32 may have any suitable shape as desired. Each of the main bodies 30, 32 may be a unitary structure or formed from multiple components, if desired. It is also understood that the main bodies 30, 32 may be formed from any suitable material such as a metal, a non-metal (e.g., plastic), and the like, or a combination thereof, for example. The main bodies 30, 32 may be formed by a molding process, an additive process (e.g. a three-dimensional printing process), a subtractive process (e.g., a machining process), or any other forming or manufacturing process, or a combination thereof, as desired.

In some embodiments, the main body 30 of one or more of the first flow control members 26 and/or the main body 32 of one or more of the second flow control members 28 of at least one of the fluid valve assemblies 20 may have one or more fluid passageways 38 formed therein to receive a flow of a fluid therethrough. Each of the fluid passageways 38 may include one or more fluid openings 40. Additional fluid openings 40 may be formed in the main bodies 30, 32 of the flow control members 26, 28, if desired. Each of the fluid openings 40 may function as a fluid inlet and/or a fluid outlet during operation of the fluid valve system 16. As best seen in FIG. 2, a cross-sectional area of each of the fluid openings 40 may vary and a cross-sectional shape of each of the fluid openings 40 may be non-circular. The cross-sectional area and shape of the fluid passageways 38 and/or the fluid openings 40 facilitates proportional flow through the fluid valve system 16 and the control module 10. It should be appreciated that the shape, size, and configuration of the flow control members 26, 28 of the fluid valve system 16 results in simplified manufacture (e.g., a molding process, a three-dimensional printing process, a machining process, or any other forming process, or a combination thereof, as desired) and sealing structure of the fluid valve system 16 as well as a compact shape, size, and configuration of the control module 10.

The housing 22 of the fluid valve system 16 may include one or more chambers (as indicated by reference number 142 in the embodiment shown in FIG. 21) formed therein to receive the fluid valve assemblies 20. In one particular embodiment, the housing 22 may include a first chamber, a second chamber and a third chamber. It should be appreciated that each of the chambers may have any size and shape as desired to receive a respective one of the fluid valve assemblies 20 therein. The first and second flow control members 26, 28 of each of the fluid valve assemblies 20 may be moveably disposed in the chamber of the housing 22 so that during certain operating modes of the control module 10 and thermal management system 50, at least one of the fluid openings 40 of the fluid passageways 38 of the flow control members 26, 28 is generally aligned with at least one fluid inlet formed in an outer wall of the housing 22 and at least one of the fluid openings 40 of the fluid passageways 38 of the flow control members 26, 28 is generally aligned with at least one fluid outlet formed in the outer wall of the housing 22. The fluid inlets and the fluid outlets formed in the housing 22 of the fluid valve system 16 may be in fluid communication with the openings 18 of the fluid manifolds 12, 14.

In some embodiments, the control module 10, and more particularly the housing 22 of the fluid valve system 16, may include electronic water pumps mounted directly and operating integral to the functioning of the fluid valve assemblies 20. It is understood, however, that the electronic water pumps may be disposed elsewhere and/or mounted on the control module 10 at various other locations.

One or more sealing elements (e.g. O-rings, gaskets, elastomeric seals, and the like), may be disposed between at least one of the flow control members 26, 28 of at least one of the fluid valve assemblies 20, and an inner surface of the housing 22 to form a substantially fluid-tight seal therebetween and militate against an undesired leakage of the fluid around a periphery of the fluid openings 40 of the fluid passageways 38. It is understood that various other sealing methods may be employed if desired.

Figure 3:
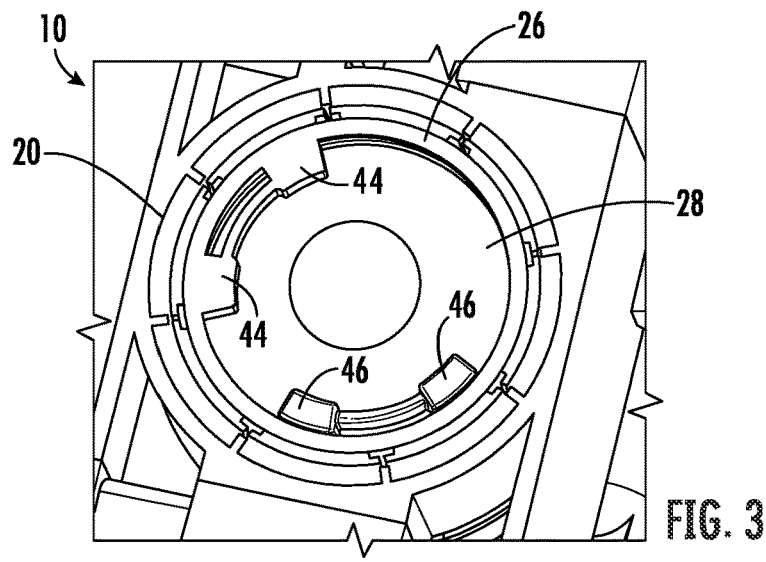
FIG. 3 is a perspective view of a portion of one of the fluid valve assemblies of the fluid valve system of the control module of FIG. 1, showing positioning elements thereof.

Each of the flow control members 26, 28 of each of the fluid valve assemblies 20 may be selectively positionable within the housing 22 of the fluid valve system 16 and configured to selectively control the flow of the one or more fluids therethrough. In certain embodiments, the first flow control members 26 and a corresponding one of the second flow control members 28 of at least one of the fluid valve assemblies 20 are in a stacked relationship within the chamber of the housing 22. In embodiment shown in FIG. 2, the first flow control member 26 may be in an uppermost position and the second flow control member 28 may be in a lowermost position. As best seen in FIG. 3, the main body 30 of the first flow control members 26 may include one more positioning elements 44 and the main body 32 of the second flow control members 28 may include one or more positioning elements 46. Each of the positioning elements 44, 46 may extend outwardly and axially along a central axis of the main body 30. As depicted, the positioning elements 44 of the first flow control members 26 may extend downwardly from a surface of the main body 30 and the positioning elements 46 of the second flow control members 28 may extend upwardly from a surface of the main body 32 facing the surface of the main body 30 to permit selective engagement therebetween during positioning of the flow control members 26, 28.

The flow control members 26, 28 in the stacked relationship are configured to rotate in unison or substantially simultaneously when the positioning elements 44 of the first flow control members 26 engage the positioning elements 46 of the second flow control members 28. When the positioning elements 44, 46 are disengaged, the first flow control member 26 of the fluid valve assemblies 20 may be operated proportionally of the second flow control member 28 of the fluid valve assemblies 20. Thus, the first flow control member 26 may rotate independently while the second flow control member 28 remains stationary. In a non-limiting example, the first flow control member 26 is caused to move in the first rotational direction until the positioning elements 44 thereof engage the positioning element 46 of the second flow control member 28. Once the positioning elements 44, 46 engage, the flow control members 26, 28 rotate substantially simultaneously in the first rotational direction until a desired position of the second flow control member 28 is reached. In some circumstances, a desired position of the first flow control member 26 may not be achieved during the positioning of the second flow control member 28 in its desired position. Accordingly, the first flow control member 26 may then be caused to move in the opposite second rotational direction to disengage the positioning elements 44, 46 so that the desired position of the second flow control member 28 is maintained. The first flow control member 26 may then continue to rotate in the second rotational direction until the desired position thereof is reached.

Each of the flow control members 26, 28 may be selectively positioned between 0 and 360 degrees about the central axis thereof. However, in some embodiments, each of the flow control members 26, 28 may interface with one or more drive stops during the positioning thereof. The drive stops may be configured to prevent at least one of the flow control members 26, 28 from rotating the full 360 degrees about the central axis thereof and/or define a range of rotational movement of the flow control member 26, 28. As a non-limiting example, at least one of the flow control members 26, 28 may interface with one or more drive stops during the positioning thereof to limit a range of rotational movement as well as militate against over-rotation. In preferred embodiments, each of the flow control members 26, 28 of each of the fluid valve assemblies 20 may be positioned in a desired position.

At least one driven element (as indicated by reference number 148 in the embodiment shown in FIG. 15), for example a driven gear, a pinion, etc., may be formed on the main body 30 of the first flow control members 26. It is understood, however, that the driven element may be formed on the main body 32 of the second flow control members 28, if desired. The driven element may extend outwardly and axially along the central axis of the main body 30. The driven element may be configured to be coupled to a driving element or actuator 49 to cause the rotational movement of one or more of the flow control members 26, 28 about the central axis thereof in the first rotational direction and the opposite second rotational direction. The driving element/actuator 49 may be powered by any electric motor with an ability to generate rotary motion. For example, the driving element/actuator 49 may be driven by a stepper motor or a brushless DC (BLDC) motor. It is understood that other methods of actuation and causing the rotational movement of the flow control members 26, 28 within the fluid valve system 16 may be used.

An exemplary embodiment of the thermal management system 50 may include a refrigerant circuit (e.g., refrigerant thermal management system (RTMS)) in heat exchange communication with a coolant circuit. The thermal management system 50 may comprise a heater core, a cooler core, a power source (e.g. a battery), one or more heat exchangers (e.g., a condenser, an evaporator, a chiller, a radiator), one or more valves (e.g., a bypass valve, a heater control valve), one or more prime movers (e.g., a coolant pump, a refrigerant pump), and/or one or more blower assemblies. It is understood that the thermal management system may itself by modular in configuration with the described control module 10.

It should be appreciated that the control module 10 and the thermal management system 50 may include more or less components, valves, conduits, and other features and aspects than illustrated and described herein without departing from the spirit and scope of the present disclosure.

FIG. 6 is a table indicating valve positions of the fluid valve assemblies 20a, 20b, 20c of the control module 10 of FIG. 1 when the control module 10 is operating in a battery cooling mode (Mode B). In a non-limiting example, both of the flow control members 26, 28 of the first fluid valve assembly 20a have valve positions of 0 degrees, the first flow control member 26 of the second fluid valve assembly 20b has a valve position of 0 degrees while the second flow control member 28 thereof is to a first proportional valve, and the first flow control member 26 of the third fluid valve assembly 20c has a valve position of 135 degrees while the second flow control member 28 thereof is to a second proportional valve.

FIG. 7 is a table indicating valve positions of the fluid valve assemblies 20a, 20b, 20c of the control module 10 of FIG. 1 when the control module 10 is operating in a cabin and battery active cooling mode (Mode C). In a non-limiting example, the first flow control member 26 of the first fluid valve assembly 20a has a valve position of 45 degrees and the second flow control member 28 thereof is positioned at 0 degrees, the first flow control member 26 of the second fluid valve assembly 20b has a valve position of 45 degrees while the second flow control member 28 thereof is to the first proportional valve, and the first flow control member 26 of the third fluid valve assembly 20c has a valve position of 135 degrees while the second flow control member 28 thereof is to the second proportional valve.

FIG. 8 is a table indicating valve positions of the fluid valve assemblies 20a, 20b, 20c of the control module 10 of FIG. 1 when the control module 10 is operating in a cabin cooling/dehumidify/re-heat with passive battery cooling mode (Mode D). In a non-limiting example, the first flow control member 26 of the first fluid valve assembly 20a has a valve position of 135 degrees and the second flow control member 28 thereof is positioned at 45 degrees, the first flow control member 26 of the second fluid valve assembly 20b has a valve position of 45 degrees while the second flow control member 28 thereof is to the first proportional valve, and the first flow control member 26 of the third fluid valve assembly 20c has a valve position of 90 degrees while the second flow control member 28 thereof is to the second proportional valve.

FIG. 9 is a table indicating valve positions of the fluid valve assemblies 20a, 20b, 20c of the control module 10 of FIG. 1 when the control module 10 is operating in a cabin cooling with battery circulate mode (Mode N). In a non-limiting example, the first flow control member 26 of the first fluid valve assembly 20a has a valve position of 90 degrees and the second flow control member 28 thereof is positioned at 0 degrees, the first flow control member 26 of the second fluid valve assembly 20b has a valve position of 135 degrees while the second flow control member 28 thereof is to the first proportional valve, and the first flow control member 26 of the third fluid valve assembly 20c has a valve position of 135 degrees while the second flow control member 28 thereof is to the second proportional valve.

FIG. 10 is a table indicating valve positions of the fluid valve assemblies 20a, 20b, 20c of the control module 10 of FIG. 1 when the control module 10 is operating in a cabin and battery heating or stationary battery only heating mode (Mode H). In a non-limiting example, the first flow control member 26 of the first fluid valve assembly 20a has a valve position of 135 degrees and the second flow control member 28 thereof is positioned at 90 degrees, the first flow control member 26 of the second fluid valve assembly 20b has a valve position of 90 degrees while the second flow control member 28 thereof is to the first proportional valve, and the first flow control member 26 of the third fluid valve assembly 20c has a valve position of 45 degrees while the second flow control member 28 thereof is to the second proportional valve.

FIG. 11 is a table indicating valve positions of the fluid valve assemblies 20a, 20b, 20c of the control module 10 of FIG. 1 when the control module 10 is operating in a cabin heating with passive battery heating and cooling mode (Mode P). In a non-limiting example, the first flow control member 26 of the first fluid valve assembly 20a has a valve position of 135 degrees and the second flow control member 28 thereof is positioned at 135 degrees, the first flow control member 26 of the second fluid valve assembly 20b has a valve position of 0 degrees while the second flow control member 28 thereof is to the first proportional valve, and the first flow control member 26 of the third fluid valve assembly 20c has a valve position of 0 degrees while the second flow control member 28 thereof is to the second proportional valve.

FIGS. 12-15 illustrate a multi-mode control module 10' for a thermal management system 50' according to another embodiment of the present disclosure. Features, aspects, and structure of the control module 10' and the thermal management system 50' are substantially similar or identical to the control module 10 and the thermal management system 50 described herein and have like identifying numerals except with the addition of a prime (') symbol. For simplicity, the control module 10 and the thermal management system 50 described hereinabove may be referenced for description of the control module 10' and the thermal management system 50'.

FIG. 16 is a table indicating valve positions of the fluid valve assemblies 20a', 20b', 20c' of the control module 10' of FIG. 12, a first proportional valve, and a second proportional valve across various modes of the thermal management system 50'.

FIG. 17 is a table indicating valve positions of the fluid valve assemblies 20a', 20b', 20c' of the control module 10' of FIG. 12 when the control module 10' is operating in the battery cooling mode (Mode B). In a non-limiting example, the first flow control member 26' of the first fluid valve assembly 20a' has a valve position of 5 degrees and the second flow control member 28' thereof is not applicable, the first flow control member 26' of the second fluid valve assembly 20b' has a valve position of 285 degrees while the second flow control member 28' thereof is to the first proportional valve, and the first flow control member 26' of the third fluid valve assembly 20c' has a valve position of 285 degrees while the second flow control member 28' thereof is to the second proportional valve.

FIG. 18 is a table indicating valve positions of the fluid valve assemblies 20a', 20b', 20c' of the control module 10' of FIG. 12 when the control module 10' is operating in the cabin and battery active cooling mode (Mode C). In a non-limiting example, the first flow control member 26' of the first fluid valve assembly 20a' has a valve position of 5 degrees and the second flow control member 28' thereof is not applicable, the first flow control member 26' of the second fluid valve assembly 20b' has a valve position of 195 degrees while the second flow control member 28' thereof is to the first proportional valve, and the first flow control member 26' of the third fluid valve assembly 20c' has a valve position of 285 degrees while the second flow control member 28' thereof is to the second proportional valve.

FIG. 19 is a table indicating valve positions of the fluid valve assemblies 20a', 20b', 20c' of the control module 10' of FIG. 12 when the control module 10' is operating in the cabin cooling/dehumidify/re-heat with passive battery cooling mode (Mode D). In a non-limiting example, the first flow control member 26' of the first fluid valve assembly 20a' has a valve position of 5 degrees and the second flow control member 28' thereof is not applicable, the first flow control member 26' of the second fluid valve assembly 20b' has a valve position of 195 degrees while the second flow control member 28' thereof is to the first proportional valve, and the first flow control member 26' of the third fluid valve assembly 20c' has a valve position of 195 degrees while the second flow control member 28' thereof is to the second proportional valve.

FIG. 20 is a table indicating valve positions of the fluid valve assemblies 20a', 20b', 20c' of the control module 10' of FIG. 12 when the control module 10' is operating in the cabin cooling with battery circulate mode (Mode N). In a non-limiting example, the first flow control member 26' of the first fluid valve assembly 20a' has a valve position of 50 degrees and the second flow control member 28' thereof is not applicable, the first flow control member 26' of the second fluid valve assembly 20b' has a valve position of 240 degrees while the second flow control member 28' thereof is to the first proportional valve, and the first flow control member 26' of the third fluid valve assembly 20c' has a valve position of 285 degrees while the second flow control member 28' thereof is to the second proportional valve.

FIG. 21 is a table indicating valve positions of the fluid valve assemblies 20a', 20b', 20c' of the control module 10' of FIG. 12 when the control module 10' is operating in a cabin and battery heating or stationary battery only heating mode (Mode H). In a non-limiting example, the first flow control member 26' of the first fluid valve assembly 20a' has a valve position of 95 degrees and the second flow control member 28' thereof is not applicable, the first flow control member 26' of the second fluid valve assembly 20b' has a valve position of 240 degrees while the second flow control member 28' thereof is to the first proportional valve, and the first flow control member 26' of the third fluid valve assembly 20c' has a valve position of 285 degrees while the second flow control member 28' thereof is to the second proportional valve.

FIG. 22 is a table indicating valve positions of the fluid valve assemblies 20a', 20b', 20c' of the control module 10' of FIG. 12 when the control module 10' is operating in the cabin heating with passive battery heating and cooling mode (Mode P). In a non-limiting example, the first flow control member 26' of the first fluid valve assembly 20a' has a valve position of 140 degrees and the second flow control member 28' thereof is not applicable, the first flow control member 26' of the second fluid valve assembly 20b' has a valve position of 240 degrees while the second flow control member 28' thereof is to the first proportional valve, and the first flow control member 26' of the third fluid valve assembly 20c' has a valve position of 240 degrees while the second flow control member 28' thereof is to the second proportional valve.

Advantageously, the control modules 10, 10' have the ability to achieve six, or more, modes of operation with only three driving elements/actuators; operating six flow control members independently with the only three driving elements/actuators; and operating one of the first and second flow control members of at least one of the fluid valve assemblies proportionally while a remaining one of the first and second flow control members of the at least one of the fluid valve assemblies remains stationary in position.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:
1. A fluid valve assembly, comprising:
a first flow control member; and
a second flow control member in stacked relationship with the first flow control member, wherein the first flow control member is configured to rotate substantially simultaneously and independently from the second control member, wherein at least one of the first flow control member and the second flow control member includes a main body having at least one fluid passageway formed therein, wherein the main body of the first flow control member includes at least one positioning element extending axially outwardly from a surface thereof towards the second flow control member and spaced radially outwardly from a central axis thereof, wherein the main body of the second flow control member includes at least one positioning element extending axially outwardly from a surface thereof towards the first flow control member and spaced radially outwardly from a central axis thereof, wherein the at least one positioning element of the first flow control member and the at least one positioning element of the second flow control member are located in and travel along a common annular path, wherein each of the flow control members is selectively positionable between 0 and 360 degrees about the central axis thereof, wherein the at least one positioning element of the first flow control member includes a first mating surface and the at least one positioning element of the second flow control member includes a second mating surface, the first and second mating surfaces are complementary mating surfaces configured to selectively engage one another in surface-to-surface contact, wherein the at least one positioning element of each of the first and second flow control members is arc-shaped and configured to allow the first control member to rotate independently of the second control member through a rotation of greater than 80 degrees about the central axis, wherein the first flow control member is caused to move in a first direction until the at least one positioning element of the first flow control member engages the at least one positioning element of the second flow control member, wherein, once the at least one positioning element of the first flow control member selectively engages the at least one positioning element of the second flow control member, the first flow control member and the second flow control member rotate substantially simultaneously in the first direction until a desired position of the second flow control member is reached, and wherein, when a desired position of the first flow control member is not achieved during the positioning of the second flow control member in its desired position, the first flow control member is caused to move in an opposite second direction to disengage the at least one positioning element of the first flow control member from the at least one positioning element of the second flow control member while the desired position of the second flow control member is maintained, and the first flow control member continues to independently rotate in the second direction until the desired position of the first flow control member is reached.

2. The fluid valve assembly of claim 1, wherein the first flow control member is configured to be driven by at least one of a driving element and an actuator.

3. The fluid valve assembly of claim 1, wherein the second flow control member is configured to be driven by the first flow control member.

4. The fluid valve assembly of claim 1, wherein the main body of the first flow control member includes at least one driven element provided thereon.

5. A control module, comprising:
at least one fluid manifold; and
a fluid valve system in fluid communication with the at least one fluid manifold, wherein the control module is configured to selectively control a flow of one or more fluids through a thermal management system, wherein the fluid valve system includes a plurality of fluid valve assemblies, wherein each of the fluid valve assemblies is independently controlled based on an operating mode of the thermal management system, and wherein at least one of the fluid valve assemblies comprises:
a first flow control member; and
a second flow control member in stacked relationship with the first flow control member, wherein the first flow control member is configured to rotate substantially simultaneously and independently from the second control member, wherein at least one of the first flow control member and the second flow control member includes a main body having at least one fluid passageway formed therein, wherein the main body of the first flow control member includes at least one positioning element extending axially outwardly from a surface thereof towards the second flow control member and spaced radially outwardly from a central axis thereof, wherein the main body of the second flow control member includes at least one positioning element extending axially outwardly from a surface thereof towards the first flow control member and spaced radially outwardly from a central axis thereof, wherein the at least one positioning element of the first flow control member and the at least one positioning element of the second flow control member are located in and travel along a common annular path, wherein each of the flow control members is selectively positionable between 0 and 360 degrees about the central axis thereof, wherein the at least one positioning element of the first flow control member includes a first mating surface and the at least one positioning element of the second flow control member includes a second mating surface, the first and second mating surfaces are complementary mating surfaces configured to selectively engage one another in surface-to-surface contact, wherein the at least one positioning element of each of the first and second flow control members is arc-shaped and configured to allow the first control member to rotate independently of the second control member through a rotation of greater than 180 degrees about the central axis, wherein the first flow control member is caused to move in a first direction until the at least one positioning element of the first flow control member engages the at least one positioning element of the second flow control member, wherein, once the at least one positioning element of the first flow control member selectively engages the at least one positioning element of the second flow control member, the first flow control member and the second flow control member rotate substantially simultaneously in the first direction until a desired position of the second flow control member is reached, and wherein, when a desired position of the first flow control member is not achieved during the positioning of the second flow control member in its desired position, the first flow control member is caused to move in an opposite second direction to disengage the at least one positioning element of the first flow control member from the at least one positioning element of the second flow control member while the desired position of the second flow control member is maintained, and the first flow control member continues to independently rotate in the second direction until the desired position of the first flow control member is reached.

6. The control module of claim 5, wherein a position of at least one of the first flow control member and the second flow control member depends on the operating mode of the thermal management system.

7. The control module of claim 5, wherein one of the fluids is a refrigerant and another one of the fluids is a coolant.

8. The control module of claim 5, wherein the first flow control member is configured to be driven by at least one of a driving element and an actuator.

9. The control module of claim 5, wherein the second flow control member is configured to be driven by the first flow control member.

10. The control module of claim 5, wherein the main body of the first flow control member includes at least one driven element provided thereon.

11. A method of operation of a fluid valve assembly, comprising:
providing a first flow control member;
providing a second flow control member in stacked relationship with the first flow control member, wherein the first flow control member is configured to rotate substantially simultaneously and independently from the second control member;
causing a rotational movement of the first flow control member in a first direction to selectively position the second flow control member in a desired position; and
causing a rotational movement of the first flow control member in an opposite second direction to selectively position the first control member in a desired position while the desired position of the second flow control member is maintained,
wherein at least one of the first flow control member and the second flow control member includes a main body having at least one fluid passageway formed therein,
wherein the main body of the first flow control member includes at least one positioning element extending axially outwardly from a surface thereof towards the second flow control member and spaced radially outwardly from a central axis thereof,
wherein the main body of the second flow control member includes at least one positioning element extending axially outwardly from a surface thereof towards the first flow control member and spaced radially outwardly from a central axis thereof,
wherein the at least one positioning element of the first flow control member includes a first mating surface and the at least one positioning element of the second flow control member includes a second mating surface, the first and second mating surfaces are complementary mating surfaces configured to selectively engage one another in surface-to-surface contact,
wherein the at least one positioning element of each of the first and second flow control members is arc-shaped and configured to allow the first control member to rotate independently of the second control member through a rotation of greater than 180 degrees about the central axis,
wherein the at least one positioning element of the first flow control member and the at least one positioning element of the second flow control member are located in and travel along a common annular path, and
wherein each of the flow control members is selectively positionable between 0 and 360 degrees about the central axis thereof.

* * * * *